(12) United States Patent
Beard et al.

(10) Patent No.: US 10,467,159 B2
(45) Date of Patent: Nov. 5, 2019

(54) MEMORY NODE CONTROLLER

(71) Applicant: ARM LTD, Cambridge (GB)

(72) Inventors: Jonathan Curtis Beard, Austin, TX (US); Roxana Rusitoru, Cambridge (GB); Curtis Glenn Dunham, Austin, TX (US)

(73) Assignee: Arm Limited, Cambridge (GB)

( * ) Notice: Subject to any disclaimer, the term of this patent is extended or adjusted under 35 U.S.C. 154(b) by 36 days.

(21) Appl. No.: 15/650,008

(22) Filed: Jul. 14, 2017

(65) Prior Publication Data

US 2019/0018808 A1    Jan. 17, 2019

(51) Int. Cl.
*G06F 13/16* (2006.01)
*H04L 12/931* (2013.01)
(Continued)

(52) U.S. Cl.
CPC ...... *G06F 13/1694* (2013.01); *G06F 12/0826* (2013.01); *G06F 12/1036* (2013.01);
(Continued)

(58) Field of Classification Search
CPC ............... G06F 3/00; G06F 3/06–0689; G06F 5/00–16; G06F 9/00–548; G06F 11/00–3696; G06F 12/00–16; G06F 13/00–4295; G06F 17/00–5095; G06F 21/00–88; G06F 2003/0691–0698;
(Continued)

(56) References Cited

U.S. PATENT DOCUMENTS 4,347,565 A     8/1982  Kaneda et al.
4,792,897 A  *  12/1988 Gotou ................. G06F 12/1009
                                                        711/207
(Continued)

FOREIGN PATENT DOCUMENTS

EP          3 128 415        2/2017
WO       WO 2016/160220     10/2016
WO       WO 2016/162817     10/2016
WO       WO 2016/204913     12/2016

OTHER PUBLICATIONS

Definition translation lookaside buffer (TLB); Rouse, Margaret; Sep. 2014; retrieved from https://whatis.techtarget.com/definition/translation-look-aside-buffer-TLB on Nov. 1, 2018 (Year: 2014).*
(Continued)

*Primary Examiner* — Daniel C. Chappell
(74) *Attorney, Agent, or Firm* — Leveque IP Law, P.C.

(57) ABSTRACT

A memory node controller for a node of a data processing network, the network including at least one computing device and at least one data resource, each data resource addressed by a physical address. The node is configured to couple the at least one computing device with the at least one data resource. Elements of the data processing network are addressed via a system address space. The memory node controller includes a first interface to the at least one data resource, a second interface to the at least one computing device, and a system to physical address translator cache configured to translate a system address in the system address space to a physical address in the physical address space of the at least one data resource.

22 Claims, 6 Drawing Sheets

(51) Int. Cl.
  *H04L 12/947* (2013.01)
  *G06F 12/0817* (2016.01)
  *G06F 12/1036* (2016.01)
  *G06F 12/1072* (2016.01)
  *G06F 12/1081* (2016.01)

(52) U.S. Cl.
  CPC ...... *G06F 12/1072* (2013.01); *G06F 12/1081* (2013.01); *G06F 13/1663* (2013.01); *H04L 49/252* (2013.01); *H04L 49/35* (2013.01); *H04L 49/505* (2013.01); *G06F 12/0824* (2013.01); *G06F 2212/2542* (2013.01); *G06F 2212/651* (2013.01); *G06F 2212/657* (2013.01)

(58) Field of Classification Search
  CPC .. G06F 2009/3883; G06F 2009/45562–45595; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; H04L 49/00–9094; H04L 61/00–6095
  See application file for complete search history.

(56) References Cited

U.S. PATENT DOCUMENTS

| | | |
|---|---|---|
| 5,361,337 A | 11/1994 | Okin |
| 5,426,750 A * | 6/1995 | Becker ................ G06F 12/1027 711/207 |
| 5,577,231 A | 11/1996 | Scalzi et al. |
| 5,752,275 A | 5/1998 | Hammond |
| 5,867,649 A | 2/1999 | Larson |
| 6,021,476 A | 2/2000 | Segars |
| 6,345,241 B1 | 2/2002 | Brice |
| 6,349,355 B1 | 2/2002 | Draves et al. |
| 6,633,963 B1 | 10/2003 | Ellison et al. |
| 6,704,873 B1 | 3/2004 | Underwood |
| 6,715,145 B1 | 3/2004 | Bowman-Amuah |
| 6,731,288 B2 | 5/2004 | Parsons |
| 6,789,156 B1 | 9/2004 | Waldspurger |
| 6,822,959 B2 | 11/2004 | Galbi et al. |
| 7,181,594 B2 | 2/2007 | Wilkinson, I et al. |
| 7,225,300 B1 | 5/2007 | Choquette et al. |
| 7,343,603 B1 | 3/2008 | Fresko |
| 7,356,667 B2 * | 4/2008 | Harris ................ G06F 12/1081 709/245 |
| 7,373,466 B1 | 5/2008 | Conway |
| 7,424,599 B2 | 9/2008 | Kissell et al. |
| 7,437,724 B2 | 10/2008 | Wolrich et al. |
| 7,472,253 B1 | 12/2008 | Cameron et al. |
| 7,512,769 B1 | 3/2009 | Lowell et al. |
| 7,668,165 B2 | 2/2010 | Hoskote |
| 8,250,519 B2 | 8/2012 | Budko et al. |
| 8,327,187 B1 | 12/2012 | Metcalf |
| 8,386,745 B2 * | 2/2013 | Kegel ................ G06F 12/10 711/205 |
| 8,656,397 B2 * | 2/2014 | Eidus ................ G06F 9/5088 718/102 |
| 8,667,249 B2 | 3/2014 | Baxter et al. |
| 8,850,168 B2 | 9/2014 | Yamamoto et al. |
| 8,984,255 B2 * | 3/2015 | Hsu ................ G06F 12/1027 711/122 |
| 9,081,501 B2 | 7/2015 | Asaad et al. |
| 9,081,706 B2 * | 7/2015 | Koka ................ G06F 12/0811 |
| 9,122,714 B2 | 9/2015 | Varadarajan et al. |
| 9,208,103 B2 * | 12/2015 | Kessler ................ G06F 12/1045 |
| 9,235,529 B2 * | 1/2016 | Koka ................ G06F 12/10 |
| 9,250,901 B2 | 2/2016 | Sodhi et al. |
| 9,251,089 B2 | 2/2016 | Gschwind |
| 9,268,694 B2 * | 2/2016 | Snyder, II ............ G06F 12/0808 |
| 9,367,459 B2 | 6/2016 | Yamashita et al. |
| 9,582,312 B1 | 2/2017 | Karppanen |
| 9,639,476 B2 * | 5/2017 | Chin ................ G06F 12/1027 |
| 9,645,941 B2 * | 5/2017 | Mukherjee ........... G06F 12/1036 |
| 9,690,714 B1 | 6/2017 | Sites |
| 9,785,557 B1 * | 10/2017 | Frey ................ G06F 12/0837 |
| 9,996,386 B2 | 6/2018 | Rauchfuss et al. |
| 10,037,227 B2 | 7/2018 | Therien et al. |
| 10,114,958 B2 * | 10/2018 | Sell ................ G06F 9/45558 |
| 10,133,675 B2 * | 11/2018 | Hansson ............ G06F 12/1009 |
| 10,180,913 B1 | 1/2019 | Aingaran et al. |
| 2002/0026502 A1 | 2/2002 | Phillips |
| 2004/0064668 A1 | 4/2004 | Kjos et al. |
| 2004/0117593 A1 | 6/2004 | Uhlig et al. |
| 2004/0215893 A1 | 10/2004 | Emerson et al. |
| 2005/0010728 A1 | 1/2005 | Piry et al. |
| 2005/0138515 A1 * | 6/2005 | Hyduke ................ G06F 11/261 714/741 |
| 2005/0165758 A1 | 7/2005 | Kasten et al. |
| 2005/0273571 A1 | 12/2005 | Lyon et al. |
| 2006/0253894 A1 | 11/2006 | Bookman |
| 2006/0277390 A1 | 12/2006 | Zuraski et al. |
| 2006/0288177 A1 | 12/2006 | Shaw |
| 2007/0180197 A1 | 8/2007 | Wright |
| 2007/0186054 A1 | 8/2007 | Kruckmeyer et al. |
| 2008/0104557 A1 * | 5/2008 | Gopalakrishnan .... G06F 17/505 716/115 |
| 2008/0270653 A1 | 10/2008 | Balle et al. |
| 2009/0089537 A1 | 4/2009 | Vick et al. |
| 2009/0113164 A1 | 4/2009 | Rajamony et al. |
| 2009/0172343 A1 | 7/2009 | Savagaonkar |
| 2009/0182971 A1 | 7/2009 | Greiner et al. |
| 2009/0234987 A1 | 9/2009 | Lee et al. |
| 2011/0113410 A1 | 5/2011 | Loen |
| 2011/0145542 A1 | 6/2011 | Morrow |
| 2011/0208935 A1 | 8/2011 | Grisenthwaite |
| 2012/0324148 A1 | 12/2012 | Stonelake et al. |
| 2013/0179666 A1 | 7/2013 | Yamashita et al. |
| 2013/0227248 A1 | 8/2013 | Mehta et al. |
| 2014/0006734 A1 | 1/2014 | Li et al. |
| 2014/0013074 A1 | 1/2014 | Koka |
| 2014/0052917 A1 * | 2/2014 | Koka ................ G06F 12/1027 711/120 |
| 2014/0208064 A1 | 7/2014 | Basu et al. |
| 2014/0281363 A1 | 9/2014 | Tian |
| 2014/0351519 A1 | 11/2014 | Munoz |
| 2015/0106571 A1 | 4/2015 | Bernard et al. |
| 2015/0205885 A1 | 7/2015 | Zhou et al. |
| 2015/0254104 A1 | 9/2015 | Kessler et al. |
| 2015/0286639 A1 | 10/2015 | Bordawekar |
| 2015/0301949 A1 * | 10/2015 | Koka ................ G06F 12/10 711/147 |
| 2015/0301951 A1 | 10/2015 | Bybell et al. |
| 2015/0325272 A1 | 11/2015 | Murphy |
| 2016/0085677 A1 | 3/2016 | Loh et al. |
| 2016/0147555 A1 | 5/2016 | Hepkin |
| 2016/0147620 A1 | 5/2016 | Lesartre et al. |
| 2016/0239415 A1 | 8/2016 | David et al. |
| 2016/0283399 A1 | 9/2016 | Das |
| 2017/0031832 A1 | 2/2017 | Hwang |
| 2017/0109289 A1 | 4/2017 | Gonzalez |
| 2017/0147254 A1 | 5/2017 | Adams et al. |
| 2017/0153987 A1 | 6/2017 | Gaonkar et al. |
| 2017/0161194 A1 | 6/2017 | Loh |
| 2017/0177484 A1 | 6/2017 | Conway |
| 2017/0185528 A1 | 6/2017 | Hansson et al. |
| 2017/0236243 A1 | 8/2017 | Smith |
| 2017/0286421 A1 | 10/2017 | Hayenga et al. |
| 2018/0018278 A1 | 1/2018 | Bradbury et al. |
| 2018/0150315 A1 | 5/2018 | Dunham et al. |
| 2018/0150321 A1 | 5/2018 | Dunham et al. |
| 2018/0150322 A1 | 5/2018 | Dunham et al. |

OTHER PUBLICATIONS

Violin: a framework for extensible block-level storage; Flouris et al.; 22nd IEEE / 13th NASA Goddard Conference on Mass Storage Systems and Technologies; Apr. 11-14, 2005 (Year: 2005).*

(56) References Cited

OTHER PUBLICATIONS

A memory hierarchy-aware metadata management technique for Solid State Disks; Bang et al.; 2011 IEEE 54th International Midwest Symposium on Circuits and Systems; Aug. 7-10, 2011 (Year: 2011).*

Hybrid TLB Coalescing: Improving TLB Translation Coverage under Diverse Fragmented Memory Allocations; Park et a;.; Proceedings of the 44th Annual International Symposium on Computer Architecture, pp. 444-456; Jun. 24-28, 2018 (Year: 2018).*

Efficient memory virtualization for Cross-ISA system mode emulation; Chang et al.; Proceedings of the 10th ACM SIGPLAN/SIGOPS international conference on Virtual execution environments, pp. 117-128; Mar. 1-2, 2014 (Year: 2014).*

U.S. Appl. No. 15/361,871, filed Nov. 28, 2016 entitled "Data Processing", Applicant ARM LTD.

U.S. Appl. No. 15/361,819, filed Nov. 28, 2016 entitled "Data Processing", Applicant ARM LTD.

U.S. Appl. No. 15/361,770, filed Nov. 28, 2016 entitled "Data Processing", Applicant ARM LTD.

Anedda et al., "Suspending, migrating and resuming HPC virtual clusters," Future Generation Computer Systems 26, May 20, 2010, pp. 1063-1072.

Basu et al, "Efficient virtual memory for big memory servers," ACM SIGARCH Computer Architecture News—ICSA '13, vol. 41 Issue 3, Jun. 2013, pp. 237-248.

J. Gandhi et al., "Range Translations for Fast Virtual Memory," in IEEE Micro, vol. 36, No. 3, pp. 118-126, May-Jun. 2016. doi: 10.1109/MM.2016.10.

Karakostas et al., "Redundant Memory Mappings for Fast Access to Large Memories," ISCA'15, Jun. 13-17, 2015.

R. W. Pfile, D. A. Wood and S. K. Reinhardt, "Decoupled Hardware Support for Distributed Shared Memory," Computer Architecture, 1996 23rd Annual International Symposium on, May 24, 1996, pp. 34-34. doi: 10.1109/ISCA.1996.10010.

Petter Svärd, Benoit Hudzia, Johan Tordsson, and Erik Elmroth. 2011. Evaluation of delta compression techniques for efficient live migration of large virtual machines. In Proceedings of the 7th ACM SIGPLAN/SIGOPS international conference on Virtual execution environments (VEE '11). Jul. 2011, ACM, New York, NY, USA, 111-120. DOI=http://dx.doi.org/10.1145/1952682.1952698.

Memory Management Basics, www.idc-online.com/technical_references/pdfs/information_technology/Memory_Management_Basics.pdf, 2014.

Thong Shao, CS422/522 Design & Implementation of Operating Systems Lecture 13: Address Translation, Yale University, Oct. 15, 2015, https://web.archive.org/web/20151217223456/http://fint.cs.yale.edu/cs422/lectureNotes/L13.pdf.

Arm, "ARMv8-A Address Translation," https://static.docs.arm.com/100940/0100/armv8_a_address%20translation_100940_0100_en.pdf, Feb. 28, 2017.

Yang, Junfeng, "Process and Address Space," https://web.archive.org/web/20170329090956if_/http://www.cs.columbia.edu:80/"junfeng/12sp-w4118/lectures/104-proc.pdf, Mar. 29, 2017.

Anonymous, "Fork (system call)," https://web.archive.org/web/20150124080230/https://en.wikipedia.org/wiki/Fork_(system_call), Jan. 24, 2015.

Oehmke, David W., Nathan L. Binkert, Steven K. Reinhardt and Trevor J Mudge. "Design and Applications of a Virtual Context Architecture." (2004).

Jayneel Gandhi, "Efficient Memory Virtualization," Thesis, University of Wisconsin-Madison, Aug. 19, 2016.

Grocutt et al., U.S. Appl. No. 15/825,524 unpublished application, filed Nov. 29, 2017.

L. Fiorin, G. Palermo, S. Lukovic, V. Catalano and C. Silvano, "Secure Memory Accesses on Networks-on-Chip," in IEEE Transactions on Computers, vol. 57, No. 9, pp. 1216-1229, Sep. 2008.

Porquet, J & Greiner, A & Schwarz, C., "NoC-MPU: A secure architecture for flexible co-hosting on shared memory MPSoCs," Design, Automation & Test. in Europe, 1-4, 2001.

Sambit K. Shukla, Laxmi N. Bhuyan, "A hybrid shared memory heterogenous execution platform for PCIe-based GPGPUs," 2013 20th International Conference on High Performance Computing (HiPC), vol. 1, pp. 343-352, 2013.

T. Wood et al., "CloudNet: Dynamic Pooling of Cloud Resources by Live WAN Migration of Virtual Machines," in IEEE/ACM Transactions on Networking, vol. 23, No. 5, pp. 1568-1583, Oct. 2015.

U.S. Appl. No. 15/825,524, filed Nov. 29, 2017, Inventor: Grocutt et al.

* cited by examiner

MEMORY NODE CONTROLLER

STATEMENT REGARDING FEDERALLY SPONSORED RESEARCH OR DEVELOPMENT

This invention was made with Government support under the Fast Forward 2 contract awarded by DOE. The Government has certain rights in this invention.

CROSS-REFERENCE TO RELATED APPLICATIONS

This application is related to co-pending patent application Ser. No. 15/649,930 entitled "METHOD AND APPARATUS FOR TWO-LAYER COPY-ON-WRITE; co-pending patent application Ser. No. 15/649,976 entitled "METHOD AND APPARATUS FOR FAST CONTEXT CLONONG IN A DATA PROCESSING SYSTEM; and co-pending patent application Ser. No. 15/650,056 entitled "MEMORY ADDRESS TRANSLATION, all filed on the same date as this application, and which are hereby incorporated herein by reference herein in their entirety.

TECHNICAL FIELD

The present disclosure relates to the control of physical device memory in a data processing network.

BACKGROUND

A data processing system may include multiple computing devices of various types and multiple memory resources of different types. For example, a system may include dynamic random-access memory (DRAM), a block device, a remote direct memory access (RDMA) appliance, memory located on a hardware accelerator and other types of volatile and non-volatile memory. Memory and other resources within the data processing system are addressed by a system address space, while each memory device is addressed by a physical address space.

The mapping between a system address and a corresponding physical address may be performed statically, software calls to an operating system, or through hardware caching of the software mediated translation process. Such approaches do not provide optimal use of memory, particularly when memory resources are shared between multiple processing cores or multiple processes and when memory resources have different characteristics.

DETAILED DESCRIPTION OF THE EMBODIMENTS

Figure 1:
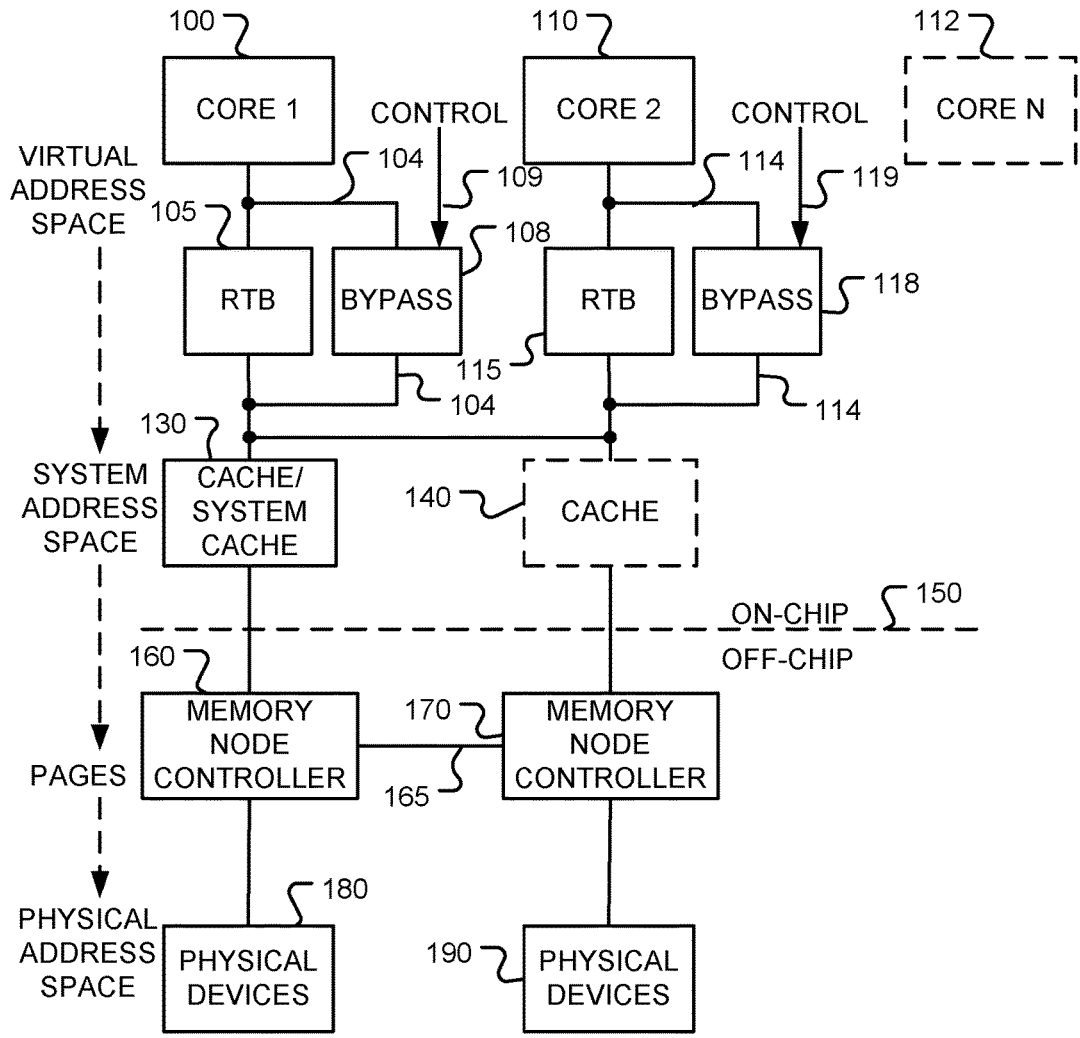
FIG. 1 shows a data processing network, consistent with certain embodiments of the disclosure.

While this invention may be embodied in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

The words "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments.

No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

System

FIG. 1 is a schematic illustration of a data processing network consistent with embodiments of the disclosure. Referring to FIG. 1, the data processing network includes a number of processor cores 100, 110. In the example of FIG. 1, two such processor cores are illustrated, but (as shown schematically by the broken line box 112) more processor cores could be provided. Alternatively, the system could comprise just one processor core.

The processor cores are arranged to process data in accordance with virtual memory addresses. For example, each of the processor cores may process data in accordance with virtual memory addresses in a respective virtual memory address space, for example under the control of an operating system or a so-called hypervisor which allocates virtual memory address spaces to the processes being performed by the different processor cores, partly as a technique for avoiding a process associated with one processor core accidently or maliciously accessing data appropriate to a process being executed by another of the processor cores.

First Layer Memory Address Translation

Elements of the data processing network, such as memory and other resources, are addressable by system addresses in a system address space. A memory address translation apparatus is provided to translate between the virtual memory addresses in the virtual memory address space and system addresses in the system address space. This system address space could be accessed via indirection or via a processing device accessing this system address space as an anonymous physical space (i.e., the physical memory for the processing device is virtualized). The system addresses are "output" memory addresses of the first layer. A system address could represent a physical address by which a physical memory device or other addressable unit could be physically addressed. Alternatively, the system addresses could represent addresses that need a further stage of address translation before being used to access a physical memory device or other addressable unit. From the point of view of address translation techniques, these options are equivalent. That is to say, the address translation techniques start with a virtual memory address and produce a system memory address. A further stage of address translation on the system address is provided by memory node controllers 160 and 170. In this example, the addresses passed to the memory node controller are from ranges. However, in an alternative embodiment, the addresses passed to the memory node controller are provided by a conventional page-based virtual memory system that sits on top of the MNC layer. In this implementation, the page-based virtual memory layer would treat them as physical device addresses, but the MNC would treat these as system addresses.

In FIG. 1, address translation is carried out by a so-called range table buffer (RTB) 105, 115. This performs address translation between a virtual memory address in the virtual memory address space and a system memory address in the system (output) address space. Each of the processor cores has a respective range table buffer. Operation of the range table buffer is described in detail in co-pending patent application Ser. No. 15/649,930, which is hereby incorporated by reference herein in its entirety. However, other address translation techniques may be used, such as a translation look-aside buffer (TLB), for example.

Bypass logic 108, 118 is provided to selectively bypass the RTBs 105, 115 when the address translation is such that a virtual memory address is equal to a corresponding system memory address. The bypass circuitry or logic is controllable by a control signal 109, 119 which will be discussed below. When the bypass logic is enabled, either the RTBs 105, 115 do not perform any translation, or the translation performed by the RTBs 105, 115 is ignored and the virtual memory address is provided by a bypass route 104, 114 for use as the output memory address.

Processor cores 100, 110 are implemented or fabricated on an integrated circuit substrate in this example, and may both (or all, in the case of more than two) be provided on the same integrated circuit substrate. These devices are referred to in FIG. 1 as being "on-chip".

Also provided on-chip, is a cache and/or system cache memory 130 to provide a temporary store for a subset of data held by the memory system to be discussed below, such as a most-recently accessed subset and/or a speculatively fetched subset. As shown in FIG. 1, processor cores 100 and 110 share a common cache/system cache 130. However, in other examples more than one cache could be provided, and another cache 140 is shown in broken line to illustrate such an arrangement. In one embodiment, the cache may be accessed in parallel with the cache/system cache 130, making use of a virtual index and system address tag.

In one embodiment, the cache/system cache 130 (140) operates according to the system (output) memory addresses generated by the RTBs 105, 115. In another embodiment, the first level cache is accessed in parallel with the RTBs 105,115.

Broken line 150 indicates a logical boundary between on-chip devices and off-chip devices, although it will be appreciated that this is just an example and that the implementation of any of the modules shown in FIG. 1 on the same integrated circuit or as different circuitries is a matter for a system designer. Thus, FIG. 1 represents a schematic example of how the separation of on-chip and off-chip components might be achieved.

Memory Node Controller

Off-chip, one or more memory node controllers 160, 170 are provided, which in turn access one or more respective physical devices 180, 190 such as random-access memories (DRAMs), Phase-Change memories (PCMs), and High Bandwidth Memories (HBMs) for example. Given that the physical devices 180, 190 operate in a physical address space, functions of the memory node controllers 160, 170 can include: (a) translation of system (output) memory addresses to physical device memory addresses, if a further stage of translation is needed, and (b) management of which of the physical devices 180, 190 needs to be accessed in order to implement a required memory access operation.

The translation operation (a) mentioned above is a second layer address translation and can be carried out either using the techniques to be discussed below, or by a known memory address translation technique. The management operation (b), to manage which of the physical devices 180, 190 should be accessed, can be carried out using, for example, a table or directory stored at one or more of the memory node controllers 160, 170 to indicate a partitioning of the physical address space between physical devices and, in turn, memory node controllers.

In the example of FIG. 1, two memory node controllers are provided. If one of the memory node controllers (such as a the memory node controller 160) receives a request for a memory access transaction which relates to an address handled by another memory node controller such as the memory node controller 170, the first memory node controller 160 can communicate via a data connection 165 with the other memory node controller 170, passing on the system address relating to that transaction and requesting that the transaction be carried out by the second memory node controller 170.

The present disclosure relates to a memory node controller (MNC). In accordance with certain embodiments, an MNC provides a dedicated hardware mechanism to collect and use metadata, including performance statistics such as re-use distance. The metadata is used to provide better placement of memory pages in the available technology.

As described above, an MNC maps at least a partition of the system address space of a data processing network to physical device memory space. The MNC provides a mapping function from the system address space to a physical space in a resource such as, for example, a DRAM device, a block device, a remote direct memory access (RDMA) appliance, or memory located on a hardware accelerator. An RDMA appliance may be any memory or storage device used for remote memory access. The MNC provides functionality for writing to a system address, maintaining page level ownership across a memory fabric, optimally placing pages in memory via metadata tracking, and the feeding forward of data to a fast on-chip memory. The MNC is implemented in hardware and may be part of an integrated circuit having additional functions. The MNC may be synthesized from a netlist or hardware description language (HDL) representation, for example.

In accordance with certain embodiments, a MNC provides a single abstraction of resources such as storage, memory, or a network interface controller (NIC) into a single system address space.

In accordance with certain embodiments, a MNC provides a means to treat memory at the MNC page level as "shareable" between multiple MNC(s).

In accordance with certain embodiments, a MNC provides a second layer of a Copy-on-Write apparatus.

In accordance with certain embodiments, a MNC provides an efficient means to perform a single copy operation. This may be provided, for example, to all levels of an accelerator device and may be provided via a NIC.

In accordance with certain embodiments, a MNC is part of a memory fabric configured following a memory server model, where the memory fabric services memory requests from various local or remote computing devices of a data processing network.

Figure 2:
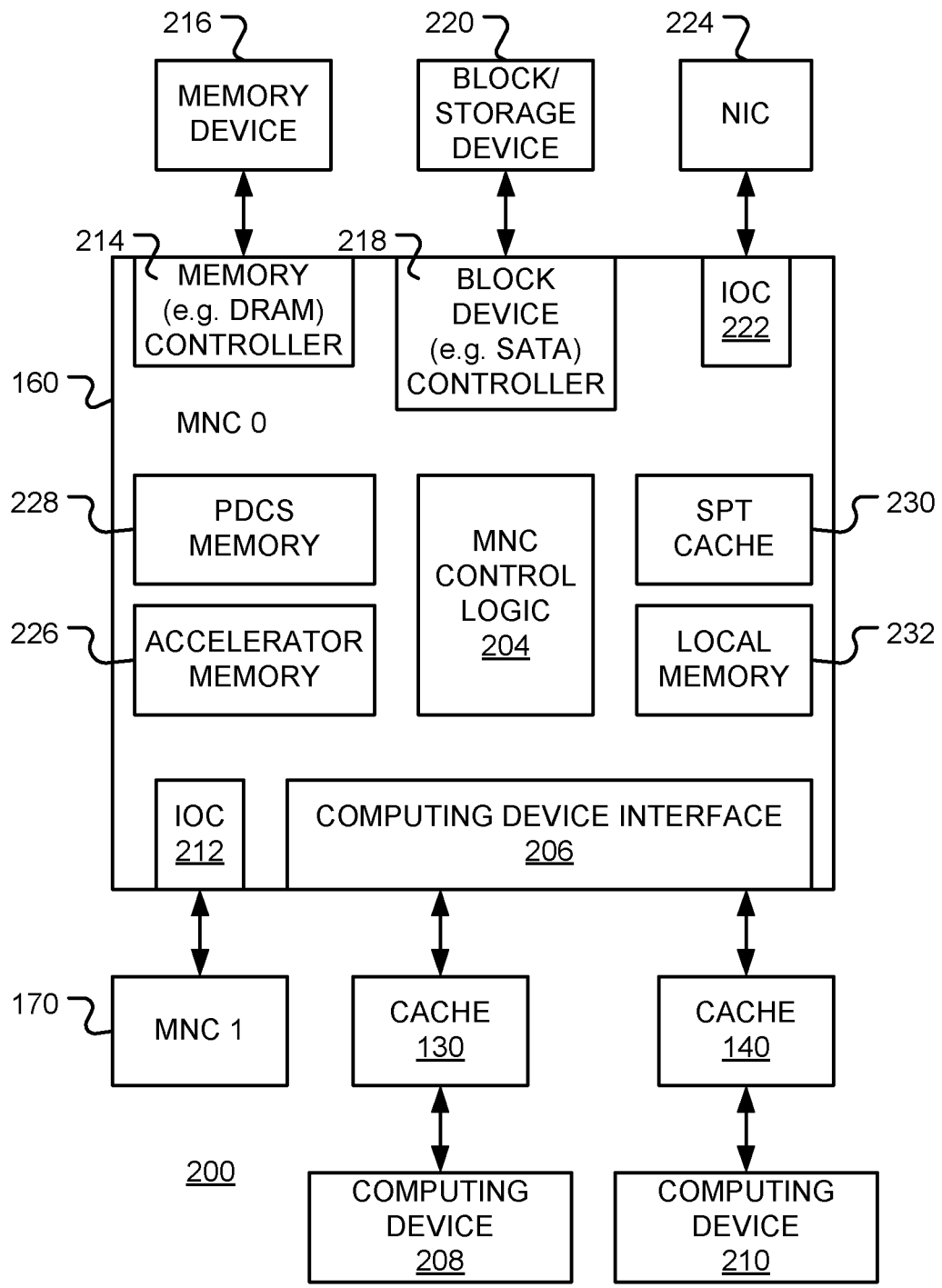
FIG. 2 is a further block diagram of a data processing network, consistent with embodiments of the disclosure.

FIG. 2 is a block diagram of a data processing network 200 consistent with embodiments of the disclosure. Data processing network 200 includes first memory node controller (MNC 0) 160 and, optionally, one or more second memory node controllers such as MCN 1 170. MNC 160 includes control logic 204 that is coupled to number of other functional blocks.

Device interface 206 enables MNC 160 to interact with multiple computing devices 208 and 210 and other devices such as hardware accelerators. A computing device may be on-chip or off-chip. System 200 is configured as a network in which MNCs 160 and 170 provide network nodes that interconnect computing devices, such as 208 and 210, with memory resources. In one embodiment, device interface 206 is compliant with the 'Peripheral Component Interconnect Express' (PCIe) standard. PCIe is a non-proprietary standard for interconnecting internal devices in a computer. For example, device interface 206 may include a PCIe root complex that enables connection with multiple computer elements or virtualized PCIe devices. When multiple MNC nodes are used, the node is 'multi-root' in the PCIe standard. However, an MNC can also support single root virtualization for guest operating systems for backwards compatibility. Devices on an MNC network are recognized via a virtualized hardware mediated PCI device tree.

IO Controller

MNC 160 also includes IO Controller (IOC) 212. IOC 212 is a generic interconnect or bus that enables connection to off-chip components. This may be a custom physical layer with a protocol that enables response to or transport of commands. The commands may be instruction set architecture (ISA) level memory instructions, for example. IOC 212 may operate under a standard structure such as a PCIe-v4 structure, for example. Other physical layers could be used depending on the characteristics required by the MNC and overall system. IOC 212 enables communication with other MNC devices.

Memory Controller

MNC 160 also includes memory/storage components such as memory controller 214 (such as one or more DRAM controllers) that enables coupling with memory device 216, block device controller 218 (such as a SATA controller, for example) for coupling with block devices 220. Each device is mapped to a physical range of memory that can be virtualized further by an operating system.

Additional IO Controller 222 enables connection to a device such as network interface controller 224.

In the embodiment shown in FIG. 2, MNC 160 also includes accelerator physical memory 226, fast local memory 232 (such as combined DRAM/NV 3-D integrated memory, for example) for use as local buffer for data rearrangement, compute in-memory and for NIC and RDMA transactions.

Physical Device Configuration Setup (PDSC) Memory

Configuration data is stored in Physical Device Configuration Setup (PDCS) memory 228. For example, the mapping of accelerator physical memory 226 through system address space may be stored in PDCS memory 228. The physical device configuration information is provided to the MNC either via firmware interface, on board non-volatile memory (such as SPI-flash or equivalent), small persistent removable storage (such as a microSD card), or any other method that can transmit information for physical mapping configurations and other configurations such as channel and interrupt assignments. Physical devices, such as SATA, PCIe, SSD, DRAM, and others, are mapped from virtual system address ranges to the physical device ranges.

In one embodiment, the PDSC memory stores information that tells the MNC about devices present on the network. This enables devices to "map" each other virtually from memory space specified into their operating systems and file systems.

Information relating to storage devices is slightly different, and tells the MNC what devices are attached, their characteristics, and what bus lanes or channels they are to be assigned. In addition, for PCIe accelerators, other configuration data might need to be provided as well as the system address mapping of that accelerator device so it can be mapped into the system address space of the host operating system for virtualization.

In summary, the configuration information in the PDSC memory provides the MNC with the information it needs to actuate external devices and map devices such as accelerators, computing devices and network interface controllers, into the system address space to enable virtualization. This information may supplement or replace a traditional device configuration within a kernel.

Other memory node controllers can easily be discovered through handshake at startup, but they could also be specified directly within the configuration information.

System to Physical Translation (STP) Cache Structure.

System to Physical Translation (STP) Cache structure 230 holds the translation structure that maps the system addresses to physical pages on various devices. An example implementation of this structure is a sparse hash map with the most frequently used N translations resident in static random-access memory (SRAM), with overflow moving to DRAM allocated by the MNC memory controller 214 through the STP cache. In some embodiments, the SRAM in the STP cache may be large enough to store most address translations. The translation from system address to physical address may be performed via a hash map and, in some hash map implementations, can be performed on a single clock cycle edge.

Caches

Caches 130 and 140 may be near-edge-of-network data caches to facilitate data transfer to and from MNC 160. These are termed data delivery caches (DDC) and may be located on-chip. Within MNC 160, memory is broken into pages that represent a specific quanta of memory (such as 4K regions), which can be placed on any type of physical device. Breaking the larger ranges into smaller pages enables improved memory technology placement and provides an upper limit for metadata collection, since data only needs to be kept at page granularity. The metadata enables memory node controller 160 to place physical pages on the most optimal memory/storage technology (based on some cost function) and, in addition, use a 'feed-forward' approach to page placement to on-chip caches. In a feed-forward approach, the MNC feeds pages of data (at some granularity) optimal for the core and application (i.e., based on bandwidth requirements, re-use distance, etc.) to high bandwidth/low latency memory on the core right where it is needed.

Network Configuration

Figure 3:
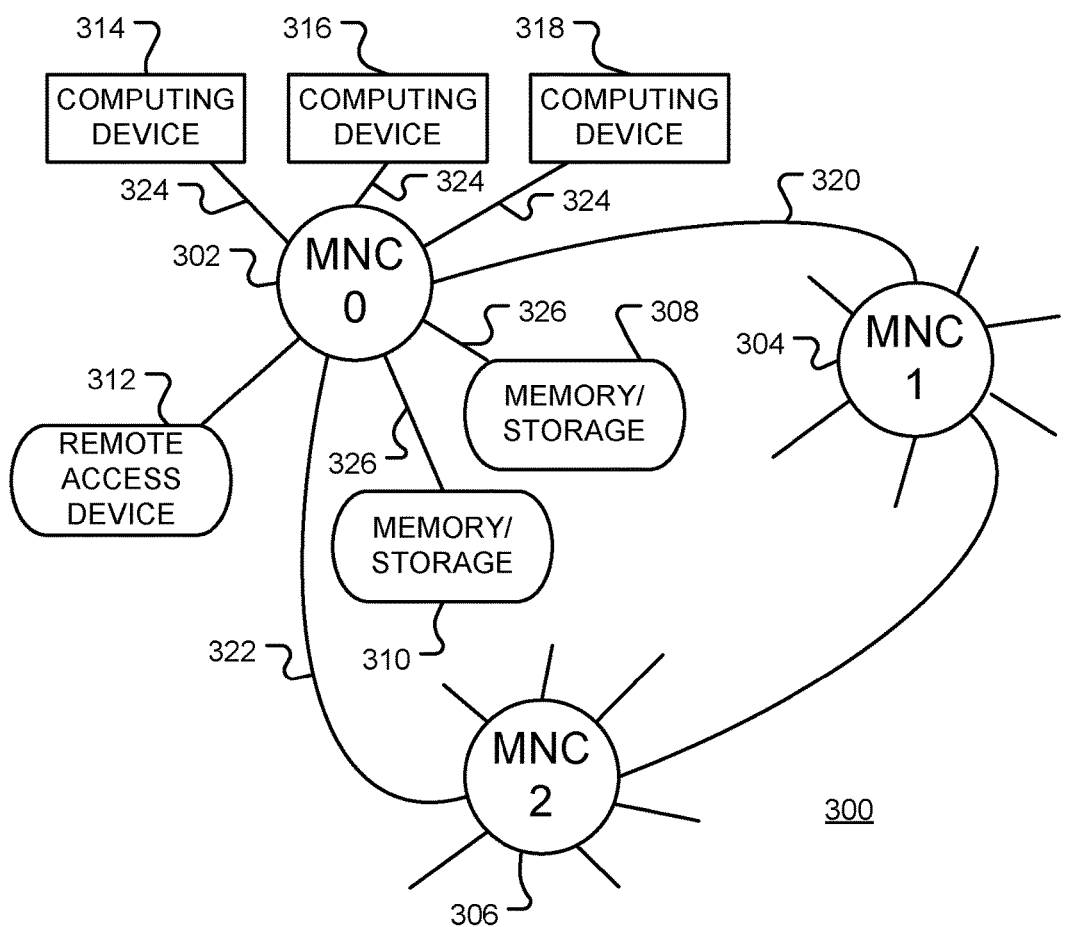
FIG. 3 is a block diagram of a simplified network incorporating memory node controllers, consistent with embodiments of the disclosure.

FIG. 3 is a block diagram of a simplified network 300 incorporating memory node controllers consistent with the disclosure. Simplified network 300 includes nodes 302, 304 and 306. Each node includes a memory node controller (MNC). Memory/storage elements 308 and 310 are in the home range of MNC-0 at node 302, as is remote access device 312 (which may be accessed via a NIC for example). Access to these elements is provided by MNC-0 (302). Network 300 is arranged as a cluster network in which MNC-0 at node 302 is configured to provide memory/storage resources to a cluster of computing devices 314, 316 and 318. These may be processor cores or other computing devices. Similarly, MNCs at nodes 304 and 306 of the network will each serve a cluster of computing devices and control access to dedicated memory/storage elements. The MNC is coupled to computing devices 314, 316 and 318 via channels 324 and to Memory/storage elements 308 and 310 via channels 326.

A function of MNC 302 in network 300 is to serve memory pages to local devices 314, 316 and 318 or to devices coupled via other nodes 304 and 306. MNC-0 at node 302 is coupled to MNC-1 at node 304 via link 320 and to MNC-2 at node 306 via link 322. It will be apparent to those of skill in the art that different network topologies may be used, and may use any number of nodes, computer elements and memory/storage devices.

In operation, requests sent from a computing device to an MNC reference a system address. Requests sent from an MNC to a memory/storage resource reference a physical (or network) address. The MNC is configured to perform a translation from system address to physical address.

Routing of Memory Access Requests in the Network

One function of a memory node controller is the translation of system addresses to physical addresses. When request to access memory at a particular address is sent in a data processing system having a network of memory node controllers, it is routed to the appropriate MNC. Various routing techniques may be used. An embodiment may use a clustered memory node controller scheme, for example, as depicted in FIG. 3. In general, in a clustered scheme, there may be up to N cores or computing devices for each of K MNCs. These N computer elements will be clustered so that the most optimal routing is to that local memory node. Each memory request originating from these cores goes directly to the closest MNC. If the request is to a page that is statically allocated to that MNC or to a page dynamically shared from another MNC then the request may be immediately returned to the core. However, if another MNC owns the memory (as determined by a coherence protocol, such as that shown in FIG. 4 and discussed below, for example), there is one additional network hop for the request before being fulfilled. When operation of the system is started, each MNC is assigned a division or partition of the overall system addressable space available to the system (with provision for re-partitioning to facilitate hot-swapping). Each of the partitions assigned to each memory node is then broken into pages. The advantage of this system is that locality is implicit through the MNC from which a memory request originates. The computing device accessing the nodes is known (or at least the cluster accessing the nodes), without additional data. Using that information, the MNC can migrate the data pages within the memory network, or check them out from the owner of the partition if the compute patterns warrant it.

Consistent with some embodiments, checking out of pages is facilitated by a limited directory structure. The limited directory structure may be stored in a memory local to the MNC (such as local memory 232 in FIG. 2), so the limited directory structure is implicitly memory-backed and hardware-managed. In a further embodiment, the limited directory structure is stored in SRAM or other fast memory, so that when pages are checked out, they can be entered into the directory structure.

Referring again to FIG. 3, when a request, from a core or computing device to access memory at a system address arrives to an MNC of the memory network 300 from the computing element, a routing calculation is performed using the system address. Since the MNC that receives the request only addresses part of the global address space, the request may need to be routed to another MNC in the network. If the current MNC doesn't control the memory partition containing the address, the request is forwarded to the appropriate MNC. For example, a request from computer element 314 to access an address in the home partition of MCN-1 at node 304 is received by MNC-0 at node 302 and forwarded to MNC-1 at node 304 via link 320.

When an address arrives in a request to the MNC from the core, a routing calculation is performed for the address. If the address is outside of the current memory node's partition, a range look-up for routing may be performed in parallel by consulting a directory to determine if the page is checked in from its external system address partition home node.

In parallel with determining routing for the system address, one of two operations could be performed, depending on implementation requirements. Firstly, a hash could be consulted to see if the page (assuming the read address is outside of the current memory node's partition of the system address space) is checked out from its home node and currently resident in the current node (one performing the address calculation). The other option is to use a directory-like methodology that sends the request packet to the system address partition's home node and then that node determines if the page is checked out by a closer node. In this approach, the originating MNC (i.e. the first node to receive the request from the computing device) is encoded in the packet. This approach may require one additional network hop if the node is checked out locally but has the benefit of decreased overall data movement while retaining the benefit of data interleaving to a requesting socket.

Within the MNC, there are multiple data structures that could be used in hardware to store paging information. In one embodiment, a sparse hash map structure is used, which may be implemented as a tree structure, for example. On a write operation to a page that has no physical backing, the backing is created in a class of memory chosen by an optimization function (likely first in DRAM as an example), however, it could easily create a new dirty page in a non-volatile media. On read operations, a similar thing occurs. The operations may be performed on a page by page basis, where a page is a subset of a range at some granularity (4K, for example). In this way, range translation is provided and pages are striped/placed on the most efficient memory technology. A depiction of this structure is described below with reference. Each page can be put anywhere in the memory network by the MNC without the core having to make any change or take any action.

Since data may be shared between computer devices, a coherency protocol is used to prevent access to memory pages containing out-of-date data. To this end, the limited directory structure may be used to store the state of data pages.

Figure 4:
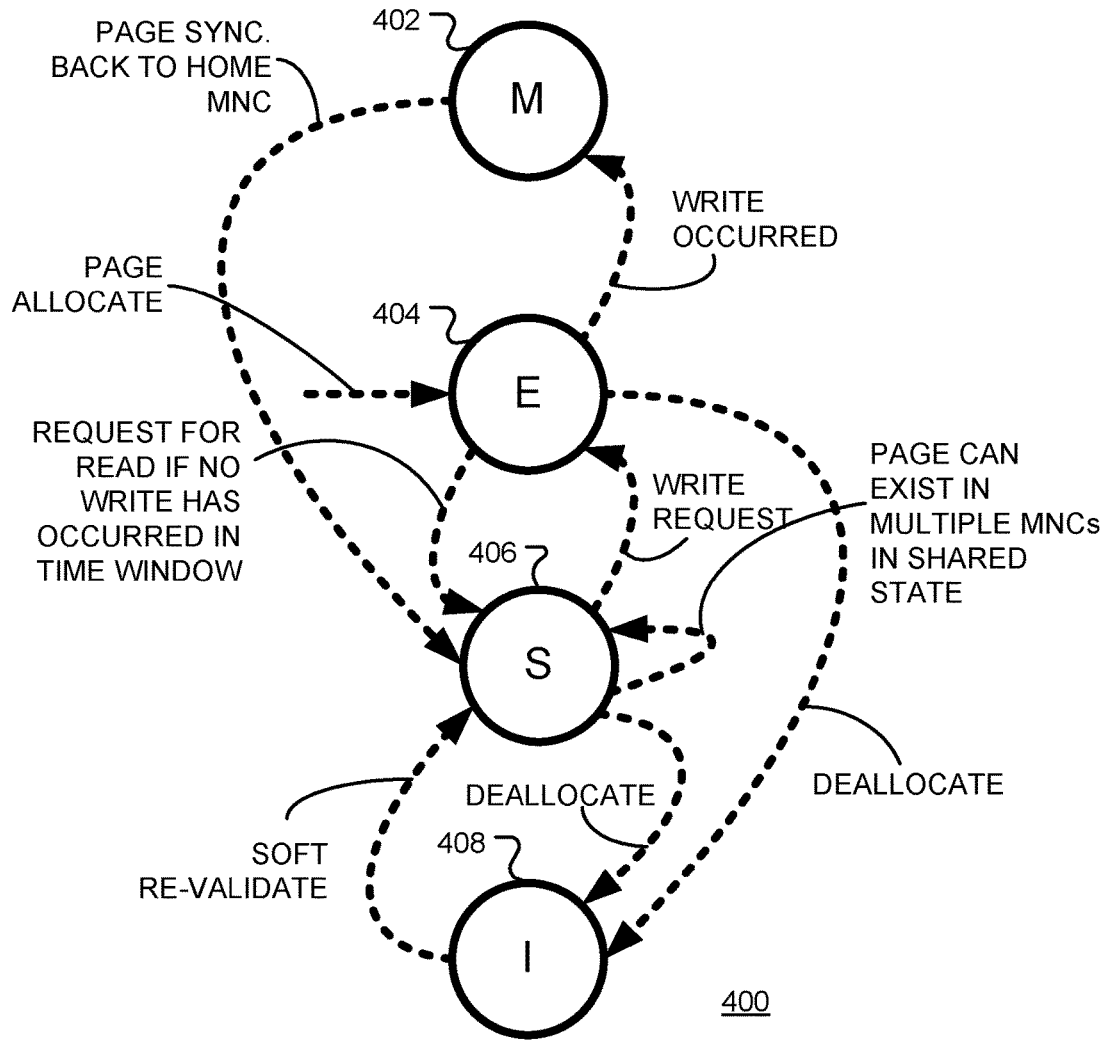
FIG. 4 shows a state diagram for a data coherency protocol, consistent with embodiments of the disclosure.

FIG. 4 shows an example state diagram 400 for a modified MESI protocol, consistent with embodiments of the disclosure. Data may be identified as being in one of four different states: "modified" (M) 402, "exclusive" (E) 404, "shared" (S) 406 and "invalid" (I) 408. MESI diagram 400 illustrates transitions between the different states. The state may be indicated by state bits in the metadata for each page, in addition to other data such as page utilization statistics, performance counters, etc. State diagram 400 illustrates a modified MESI protocol for MNC page sharing is managed within the MNC network.

Checked-out pages that are not from the current MNC's partition are termed 'foreign' pages and their checked-out states are recorded in the directory of the MNC, which may be stored in a local memory, for example. For pages in the partition of the current MNC, i.e. pages for which the current MNC is the home partition MNC, the checked-out status is indicated within the page metadata.

For example, when a page is allocated, it can be initially checked out from the home partition MNC in a "exclusive" state (E) 404. After the write has occurred, the state becomes "modified" (M) 402. After the page has been synchronized back the home partition MNC, the state returns to "shared" (S) 406.

If a page is deallocated when it is in an "exclusive" (E) state 404 or "shared" (S) state 406, the state is changed to "invalid" (I) 408. Optionally, pages can be returned to the "shared" (S) state 406 by a 're-validate' instruction.

Checked out pages will eventually be migrated back to the home partition MNC, once space is needed in the directory structure or if the page is requested in shared state from other nodes. The movement of the page back to the home partition MNC is similar to a write-back of data to memory from a standard cache. However, the MNC may keep the page in persistent memory or volatile memory, its state as a checked-out page is indicated in the metadata.

Each MNC is assigned a chunk or partition of the complete system address space at start-up or during a renegotiation process. An example system address range may be: (base_address+0)→(base_address+n). This partition is further subdivided behind the MNC into physical addresses (or network addresses in the case of a NIC). The MNC controls access to all resources behind it that are capable of storing data, and maps the system address space to physical or network addresses in those resource. File systems and networking functionality may also be mapped into this address space. Accelerators with on-board memory are also mapped into this address space and may be accessible through an interface from their virtual address space, without needing knowledge of the system address space.

Starting on a processor core, a virtual memory address in a request is translated to an address in the system address space using a range translation buffer (RTB) or a translation look-aside buffer (TLB). The request is then sent to the memory node controller.

In first embodiment, the memory space is divided between the MNCs, so that there is a fixed static mapping after boot. This approach has the advantage of being fast for the routing calculation and always going to the correct node. However, this approach may not be optimal for on-chip routing or for optimizing memory placement. One reason that the fixed calculation is sub-optimal is that it increases on-chip memory traffic, which could otherwise be used for core-to-core (or thread-to-thread) communication. Another reason is that the overhead needed to support on-chip cluster locality with N cores is $\log_2(N)$ with each memory request. Requests would be tagged to indicate their origin, and then transmitted to the MNC. This approach may be used, for example, when simplicity is more important than overhead.

In a further embodiment, it is assumed that there will be N cores per K MNCs, and that these N cores will be clustered, as opposed to being in fully connected mesh. In this approach, the routing path is from the cluster through one or more caches (include any DDC) and then to the off-chip interconnect controller associated with that cluster. This interconnect may utilize a PCIe or other physical layer, for example. MNCs are each assigned a static system address partition. This may be done after boot configuration or system reset, to facilitate hot adding/removing/swapping of storage/memory. At the MNC, the system address ranges are further subdivided into pages which are either zero allocated (for initial allocation) or point to physical memory on some device. The advantage of this routing path is that the origin of the requests is implicit in the traffic source. For example, it is known which core cluster created the traffic implicitly, without further information or meta-data. Capturing and recording the originating core would otherwise require at least enough bits to encode the number of clusters within the node with each memory request. Using the locality information, the MNC network can migrate the virtual pages within the network, or check them out from the owner of the system address partition if the compute patterns warrant it.

Efficient use of this infrastructure is facilitated by software awareness. Given that the system address space is split between N MNCs, and these MNCs are connected to computing devices based on, for example, physical locality, tasks can be scheduled such that they are executed on computing devices connected to an MNC that controls the system and physical memory already allocated, or at least to a nearby MNC. This ensures low latency communications.

Figure 5:
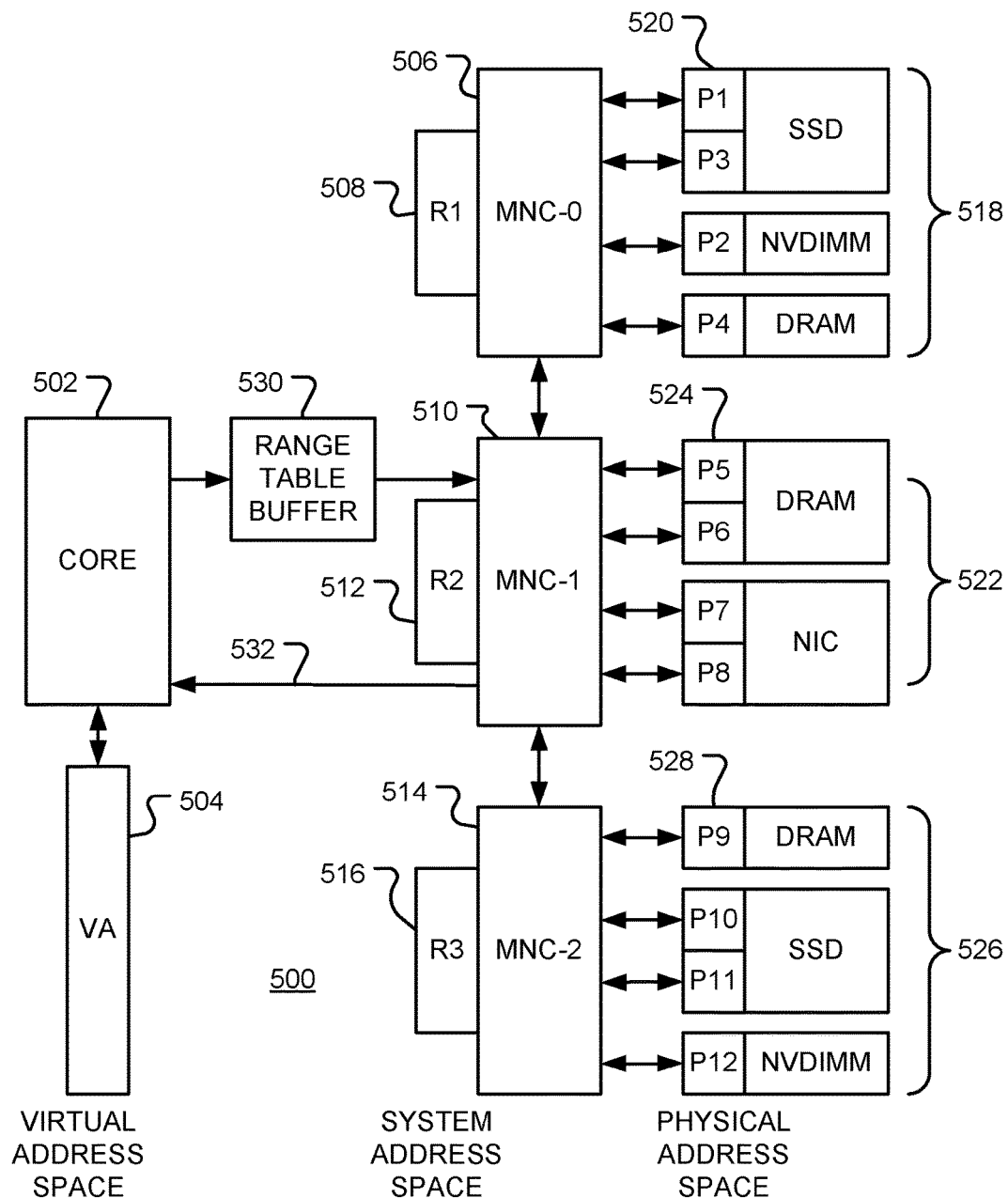
FIG. 5 is a block diagram of a data processing network, consistent with the disclosure.

FIG. 5 is a block diagram of a data processing network 500 consistent with the disclosure. Data processing network 500 includes a core or computing device 502 that operates in a virtual memory space 504. In the embodiment shown, the system address space is divided into three partitions, R1, R2 and R3. System 500 also includes MNC 506 that is associated with system memory partition 508 (R1), MNC 510 that is associated with system memory partition 512 (R2), and MNC 514 that is associated with system memory partition 516 (R3). MNC 506 controls access to memory resources 518, that store pages 520 having physical addresses P1, P2, P3 and P4 in this example. MNC 506 translates a system address in the partition R1 to a physical address in the memory resources 518. Similarly, MNC 510 controls access to memory resources 522, that store pages 524 having physical addresses P5, P6, P7 and P8 in this example. MNC 510 translates a system address in the partition R2 to a physical address in the memory resources 522. MNC 514 controls access to memory resources 526, that store pages 528 having physical addresses P9, P10, P11 and P12 in this example. MNC 514 translates a system address in the partition R3 to a physical address in the memory resources 526. In this way, a 48K address space is split into four 16K partitions and each 16K partition is split into four 4K pages that are allocated between the physical resources.

When core 502 issues a request to access data at a virtual address in space 504, the virtual address is translated to a system address in range table buffer 530. If the address is not found in a local cache, the system address is passed to the MNC coupled to core 502. In this example, the system address is passed to MNC-1 (510). MNC-1 (510) determines if the system address is in the partition R2. If it is, the corresponding memory resource of 522 is identified together with the physical address in that memory resource, and data at the physical address is accessed. A memory write access may be acknowledged over link 532. Data read from the memory resource is returned over link 532.

If the system address is not in the partition R2, the MNC that controls the partition is identified and the request is forwarded to the identified MNC where the request is serviced. Any response to a request is returned to the core 502 via link 532.

In certain embodiments, translation within the MNC between a system address and a physical address is made using a data structure stored in System to Physical Translation (STP) cache (230 in FIG. 2, for example). The data structure may be a table that uses a masking hash lookup of a page entry. For example, the page number may be computed a logical AND operation between the system address and the page size as a power of two. An example page entry in the RTP cache may contain the information shown in TABLE 1.

TABLE 1

| system address base | device ID | physical or block start (depending on previous field) | Current Location/ MESI status |
|---|---|---|---|
| 0 | ssd_zero | 0xff, 0x10f | |

In one embodiment, three pointers are used to support copy on write, one to the entry which is the current clean physical copy (the head), one that is the parent and one that is the child. This enables the update process to be optimized. Other variations will apparent to those skilled in the art.

Memory allocation may be efficiently handled through use of a buddy memory allocation scheme or other scheme that may be represented by a sparse tree. Compaction of system address ranges (re-ordering) can be accomplished, for example, by signaling the OS to find the processing threads that contain a system address and then changing out the system address ranges. This process can be time consuming. However, for a large system address space (such as 64-bits) this is unlikely happen unless current systems become very much larger.

Page information is stored in memory. In the simplest implementation of the hardware, an entry is used for each page. For example, if a single MNC is assigned a 100 TB address partition and if the page size is selected to be 2 MB, the table would fit into a small 64 MB SRAM structure even if the device was entirely full. Additional space is required if other metadata is to be stored. However, in one embodiment, the size of the table is reduced by compressing empty pages into a zero-page range. In another embodiment, the translation data may be persistent or have a second copy to ensure persistency.

Figure 6:
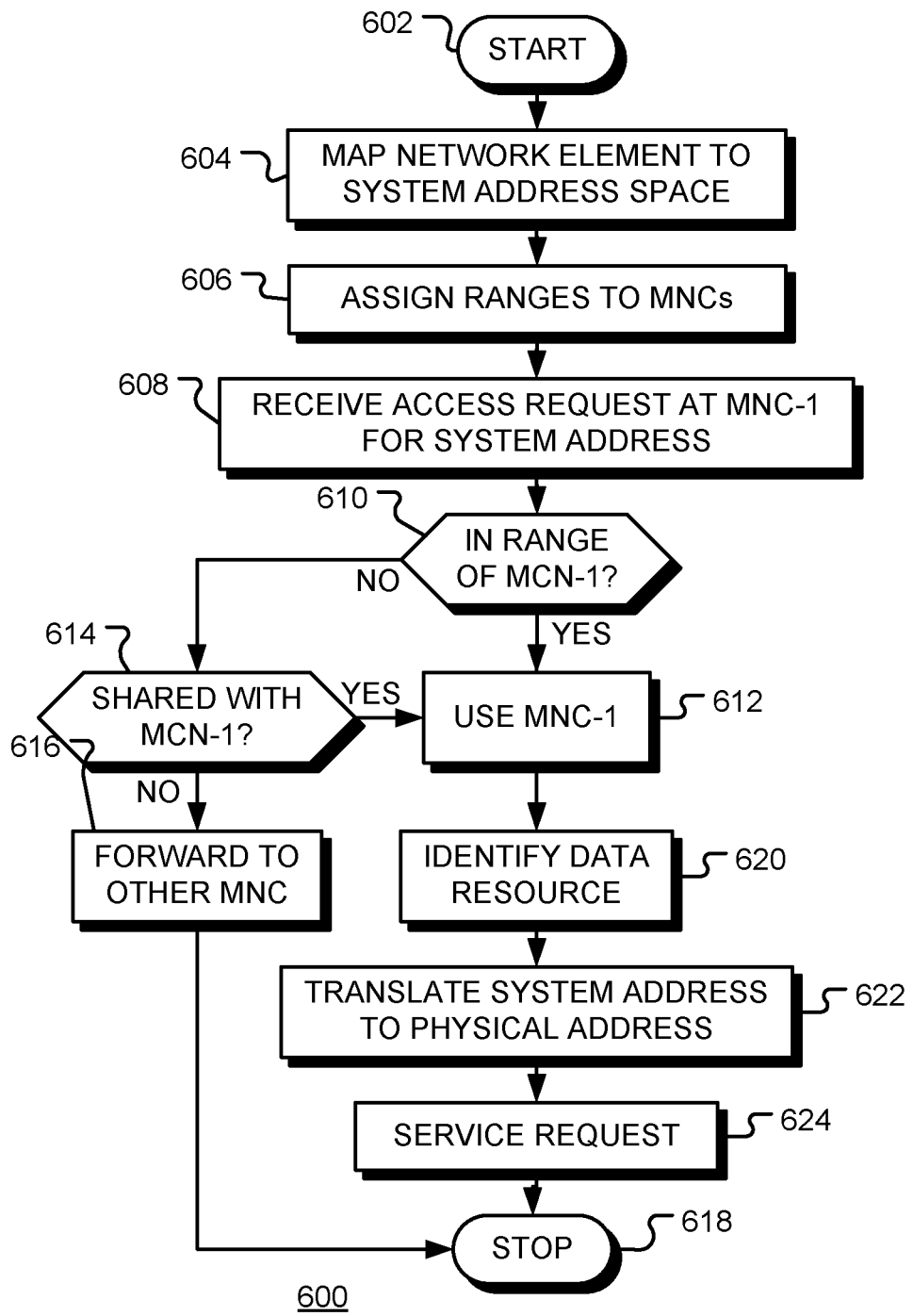
FIG. 6 is a flow chart of a method for routing memory access requests, consistent with embodiments of the disclosure.

FIG. 6 is a flow chart 600 of a method for accessing a one or more data resources by one or more computing devices in a data processing network routing memory access requests, consistent with embodiments of the disclosure. Following start block 602, elements of the data processing network are mapped to a system address space at block 604. At block 606, ranges or divisions of the system address space are assigned to memory node controllers of the data processing network. For example, a first partition may be assigned to first memory node controller, MNC-1, and a second partition assigned to a second memory node controller MNC-2. At block 608, a request is received at MNC-1 to access an element of the data processing network at a system address in the system address space. When the system address is in the partition of MNC-1, as depicted by the positive branch from decision block 610, MNC-1 is used to service the request at block 612. When the system address is not in the partition of MNC-1, as depicted by the negative branch from decision block 610, flow continues to decision block 614. If the system address is dynamically shared with the first memory node controller, as depicted by the positive branch from decision block 614, MNC-1 is again used to service the request at block 612. If the system address is not dynamically shared with the first memory node controller, as depicted by the negative branch from decision block 614, the request is forwarded to the MNC for the system address at block 616, where the request is serviced. The process terminates at block 618. MNC-1 services the request by identifying the appropriate data resource at block 620 and translating the system address to a physical address in the data resource at block 622. This may be done by accessing a table or directory, for example. Service of the request is completed at block 624 and the process terminates at block 618.

Some embodiments relate to a method for routing memory access requests, consistent with embodiments of the disclosure. The method has application to a clustered memory node controller scheme, as described above with reference to FIG. 3. In general, in a clustered scheme, there may be up to N cores or computing devices for each of K MNCs. These N computer elements will be clustered so that the most optimal routing is to that local memory node. Memory requests to access a resource a system address are received by a MNC. Each memory request originating from these cores goes directly to the closest MNC, so the request comes from core in the cluster of the local of the MNC. The channel to the appropriate data resource that holds the requested page is determined at block 620. If the request is to a page that is statically allocated to that MNC or to a page dynamically shared from another MNC then the request may immediately returned to the core. However, if another MNC owns the memory (as determined by coherence protocol, for example), there is one additional network hop for the request before being fulfilled. When operation of the system is started, each MNC is assigned a division of the overall system addressable space available to the system (with provision for re-partitioning to facilitate hot-swapping). Each of the partitions assigned to each memory node is then broken into pages. The advantage of this system is that locality is implicit through the MNC from which a memory request originates. The computing device accessing the node is known (or at least the cluster accessing the nodes), without additional data. Using that information, the MNC can migrate the data pages within the memory network, or check them out from the owner of the partition if the compute patterns warrant it.

The MNC can allocate memory from another memory node controller's system address space to use within its system address translation tables, redirecting one system address to another system address. For example, for a defragmentation operation, a first MNC could allocate memory in the system address space partition of a second MNC where the first MNC would show these pages as checked out from the second MNC in the first MNC. The first MNC would keep the physical memory backing of the pages as they were originally. Once the address range allocated from the second MNC is entered in the appropriate tables, the offsets within the range table entries may be changed to point to the new system address range. At this point the system address range that was previously used is now free. The new system address range from the second MNC and the plurality of pages making up that address range are now free to migrate independently according to the coherence protocol, meta-data, or scheduling algorithm.

The system may be equipped with a system cache structure, known as a data delivery cache (DDC). In this embodiment, a system memory request is sent simultaneously to the DDC and the MNC. If the MNC has registered that page as present in the DDC, that line is serviced from the DDC and ignored from the MNC. If that line is present in the MNC then the request is served in MNC. It should be apparent that synchronization between the MNC could take the form of a directory or filter mechanism. An example embodiment implements a send/acknowledge system, in which the DDC only begins servicing pages once the MNC has received an acknowledgement from the DDC that the pages were installed. Along with the acknowledgement the DDC will receive the outstanding memory requests from the point that the MNC decided to push the page to the DDC.

The various embodiments and examples of the present disclosure as presented herein are understood to be illustrative of the present disclosure and not restrictive thereof and are non-limiting with respect to the scope of the present disclosure.

Further particular and preferred aspects of the present disclosure are set out in the accompanying independent and dependent claims. Features of the dependent claims may be combined with features of the independent claims as appropriate, and in combinations other than those explicitly set out in the claims.

One or more memory node controllers may be implemented in an integrated circuit. The circuit may be defined be a set of instructions of a Hardware Description Language (HDL), which may be stored in a non-transient computer readable medium, for example. The instructions may be distributed via the computer readable medium or via other means such as a wired or wireless network. The instructions may be used to control manufacture or design of the integrated circuit, and may be combined with other instructions.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of this disclosure and are intended to form a part of the disclosure as defined by the following claims, which are to be interpreted in the broadest sense allowable by law.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

Accordingly, some features of the disclosed embodiments are set out in the following numbered items:

1. A memory node controller for a node of a data processing network having at least one computing device and at least one data resource, the node configured to couple the at least one computing device with the at least one data resource and elements of the data processing network addressable via a system address space, the memory node controller comprising: a first interface to the at least one data resource, where each of the at least one data resources is addressed via a physical address space; a second interface to the at least one computing device; and a system to physical address translator cache, configured to translate a system address in the system address space to a physical address in the physical address space of a data resource of the at least one data resource.

2. The memory node controller of item 1, further comprising: a physical device configuration setup (PDCS) memory that stores information indicative of a mapping of the elements of the data processing network into the system address space.

3. The memory node controller of item 1, where the at least one data resource comprises a remote network and where the first interface comprises a network interface card.

4. The memory node controller of item 1, where the first interface comprises an interface to another memory node controller.

5. The memory node controller of item 4, where the system address space comprises a plurality of address partitions and where the memory node controller is associated with a first address partition of the plurality of address partitions and the other memory node controller is associated with a second address partition of the plurality of address partitions.

6. The memory node controller of item 1, where the second interface comprises an interface to a processor core.

7. The memory node controller of item 1, where the second interface comprises an interface to a hardware accelerator.

8. The memory node controller of item 1, where the first interface comprises an interface to a memory device or a storage device.

9. A non-transient computer readable medium having instructions of a hardware description language representative of the memory node controller system of item 1.

10. A non-transient computer readable medium having a netlist representative of the memory node controller of item 1.

11. A data processing network comprising: a first memory node controller; a first plurality of addressable units addressed by a system address space and comprising a first plurality of data resources, each of the first plurality of data resources coupled to the first memory node controller via a channel and addressed by a physical address space; and a first plurality of computing devices each coupled to the first memory node controller and configured to access the first plurality of addressable units via the first memory node controller, where the first memory node controller comprises a system address to physical address translator cache configured to translating a system address received from a computing device of the first plurality of computing devices to a physical address in the address space of a data resource of the first plurality of data resources.

12. The data processing network of item 11, further comprising: one or more second memory node controllers, coupled to the first memory node controller; where the first memory node controller is assigned a first partition of system addresses in the system address space, where each of the one or more second memory node controllers is assigned a second partition of system addresses in the system address space, and where a computing device of the first plurality of computing devices comprises a range table that associates the first memory node controller with system addresses in the first partition of system addresses and associates each of the one or more second memory node controllers with system addresses in the corresponding second partition of system addresses and is configured to send a request to access memory at a system address to a memory node controller of the first and second memory node controllers associated with the system address.

13. The data processing network of item 12, further comprising: a second plurality of data resources, each coupled to a second memory node controller of the one or more second memory node controllers via a channel and having a physical address space; and a second plurality of computing devices each coupled to a second memory node controller of the one or more second memory node controllers and configured to access the data processing network via the system address space, where the one or more second memory node controllers are configured to couple the second plurality of computing devices with the second plurality of data resources.

14. The data processing network of item 11, where a first plurality of addressable units further comprises a hardware accelerator.

15. The data processing network of item 11, where a first plurality of addressable units further comprises a network interface card.

16. A method for accessing one or more data resources by one or more computing devices in a data processing network, the method comprising: mapping elements of the data processing network to a system address space; assigning a first partition of the system address space to a first memory node controller of the data processing network, where the one or more computing devices and the one or more data resources are coupled to the first memory node controller; receiving, at the first memory node controller, a request to access an element of the data processing network at a system address in the system address space; and servicing the request by the first memory node controller when the system address is in the first partition of the system address space.

17. The method of item 16, further comprising: assigning a second partition of the system address space to a second memory node controller of the data processing network; and forwarding the request to the second memory node controller when the system address is in the second partition of the system address space.

18. The method of item 16, further comprising: assigning a second partition of the system address space to a second memory node controller of the data processing network; and servicing the request by the first memory node controller when the system address is in the second partition of the system address space and the system address is dynamically shared with the first memory node controller.

19. The method of item 16, where each data resource of the one or more data resources is coupled to the first memory node controller via a channel and where servicing the request by the first memory node controller comprises: identifying a channel to a data resource of the one or more data resources corresponding to the system address; translating the system address to a physical address in the data resource; and accessing the data resource at the physical address via the identified channel.

20. The method of item 16, where the first partition of the system address space comprises a first plurality of pages, the method further comprising: assigning a second partition of the system address space to a second memory node controller of the data processing network, where the second partition of the system address space comprises a second plurality of pages; monitoring access to the second plurality of pages by the one or more computing devices coupled to the first memory node controller; and migrating a page of the second plurality of pages from the second memory node controller to the first memory node controller dependent on the monitored access.

21. The method of item 20, further comprising: recording a coherence state of the migrated page.

22. The method of item 16, where the first partition of the system address space comprises a plurality of lines, and where the data processing network further comprises a data delivery cache, the method further comprising: monitoring system memory requests to the plurality of lines by the one or more computing devices coupled to the first memory node controller; servicing a system memory request by the first memory node controller when a requested line of the plurality of lines is not present in the data delivery cache; pushing the requested lines from the first memory node controller to data delivery cache of the data processing network dependent on the monitored system memory requests; and servicing the system memory request by the data delivery cache when the requested line is present in the data delivery cache.

23. The method of item 16, further comprising: assigning a second partition of the system address space to a second memory node controller of the data processing network where one or more additional data resources are coupled to the second memory node controller; and the first memory node controller: allocating memory in address range of the second partition of the system address space; entering the allocated address range in a system address translation table of the first memory node controller; and directing memory requests for an address in the allocated address range to the second memory node controller.

What is claimed is:

1. A memory node controller for a node of a data processing network having at least one computing device and at least one data resource, the node configured to couple the at least one computing device with the at least one data resource and elements of the data processing network addressable via a system address space, the memory node controller comprising:
a first interface to the at least one data resource, where each of the at least one data resources is addressed via a physical address space;
a second interface to the at least one computing device;
a system to physical address translator cache, configured to translate a system address in the system address space to a physical address in the physical address space of a data resource of the at least one data resource, and
a dedicated hardware mechanism to collect and use metadata relating to data requests from the at least one computing device;
where the memory node controller is configured to:
push the requested data to a data delivery cache of the data processing network dependent on the collected metadata;
service a data request by the memory node controller when the requested data is not present in the data delivery cache; and
service the data request by the data delivery cache when the requested data is present in the data delivery cache.

2. The memory node controller of claim 1, further comprising:
a physical device configuration setup (PDCS) memory that stores information indicative of a mapping of the elements of the data processing network into the system address space.

3. The memory node controller of claim 1, where the at least one data resource comprises a remote network and where the first interface comprises a network interface card.

4. The memory node controller of claim 1, where the first interface comprises an interface to another memory node controller.

5. The memory node controller of claim 4, where the system address space comprises a plurality of address partitions and where the memory node controller is associated with a first address partition of the plurality of address partitions and the other memory node controller is associated with a second address partition of the plurality of address partitions.

6. The memory node controller of claim 1, where the second interface comprises an interface to a processor core.

7. The memory node controller of claim 1, where the second interface comprises an interface to a hardware accelerator.

8. The memory node controller of claim 1, where the first interface comprises an interface to a memory device or a storage device.

9. A non-transient computer readable medium having instructions of a hardware description language representative of the memory node controller system of claim 1.

10. A non-transient computer readable medium having a netlist representative of the memory node controller of claim 1.

11. A data processing network comprising:
a first memory node controller;
a first plurality of addressable units addressed by a system address space and comprising a first plurality of data resources, each of the first plurality of data resources coupled to the first memory node controller via a channel and addressed by a physical address space; and
a first plurality of computing devices each coupled to the first memory node controller and configured to access the first plurality of addressable units via the first memory node controller,
where a computing device of the first plurality of computing devices is configured to translate a virtual memory address in a memory access request to a system address in the system address space; and
where the first memory node controller comprises a system address to physical address translator cache configured to translate the system address received from the computing device of the first plurality of computing devices to a physical address in the address space of a data resource of the first plurality of data resources.

12. The data processing network of claim 11, further comprising:
one or more second memory node controllers, coupled to the first memory node controller;
where the first memory node controller is assigned a first partition of system addresses in the system address space,
where each of the one or more second memory node controllers is assigned a second partition of system addresses in the system address space, and
where a computing device of the first plurality of computing devices comprises a range table that associates the first memory node controller with system addresses in the first partition of system addresses and associates each of the one or more second memory node controllers with system addresses in the corresponding second partition of system addresses and is configured to send a request to access memory at a system address to a memory node controller of the first and second memory node controllers associated with the system address.

13. The data processing network of claim 12, further comprising:
a second plurality of data resources, each coupled to a second memory node controller of the one or more second memory node controllers via a channel and having a physical address space; and
a second plurality of computing devices each coupled to a second memory node controller of the one or more second memory node controllers and configured to access the data processing network via the system address space,
where the one or more second memory node controllers are configured to couple the second plurality of computing devices with the second plurality of data resources.

14. The data processing network of claim 11, where a first plurality of addressable units further comprises a hardware accelerator.

15. The data processing network of claim 11, where a first plurality of addressable units further comprises a network interface card.

16. A method for accessing one or more data resources by one or more computing devices in a data processing network, the method comprising:
mapping elements of the data processing network to a system address space;
assigning a first partition of the system address space to a first memory node controller of the data processing network, where the one or more computing devices and the one or more data resources are coupled to the first memory node controller and where the first partition of the system address space comprises a first plurality of pages;
receiving, at the first memory node controller, a request to access an element of the data processing network at a system address in the system address space;
servicing the request by the first memory node controller when the system address is in the first partition of the system address space;
assigning a second partition of the system address space to a second memory node controller of the data processing network, where the second partition of the system address space comprises a second plurality of pages;
monitoring access to the second plurality of pages by the one or more computing devices coupled to the first memory node controller; and
migrating a page of the second plurality of pages from the second memory node controller to the first memory node controller dependent on the monitored access.

17. The method of claim 16, further comprising:
forwarding the request to the second memory node controller when the system address is in the second partition of the system address space.

18. The method of claim 16, further comprising:
servicing the request by the first memory node controller when the system address is in the second partition of the system address space and the system address is dynamically shared with the first memory node controller.

19. The method of claim 16, where each data resource of the one or more data resources is coupled to the first memory node controller via a channel and where servicing the request by the first memory node controller comprises:
identifying a channel to a data resource of the one or more data resources corresponding to the system address;
translating the system address to a physical address in the data resource; and
accessing the data resource at the physical address via the identified channel.

20. The method of claim 16, further comprising:
recording a coherence state of the migrated page.

21. A method for accessing one or more data resources by one or more computing devices in a data processing network, the method comprising:
mapping elements of the data processing network to a system address space;
assigning a first partition of the system address space to a first memory node controller of the data processing network, where the one or more computing devices and the one or more data resources are coupled to the first memory node controller;
receiving, at the first memory node controller, a request to access an element of the data processing network at a system address in the system address space; and
servicing the request by the first memory node controller when the system address is in the first partition of the system address space;
where the first partition of the system address space comprises a plurality of lines, and where the data processing network further comprises a data delivery cache, the method further comprising:
monitoring system memory requests to the plurality of lines by the one or more computing devices coupled to the first memory node controller;
servicing a system memory request by the first memory node controller when a requested line of the plurality of lines is not present in the data delivery cache;
pushing the requested lines from the first memory node controller to the data delivery cache of the data processing network dependent on the monitored system memory requests; and
servicing the system memory request by the data delivery cache when the requested line is present in the data delivery cache.

22. A method for accessing one or more data resources by one or more computing devices in a data processing network, the method comprising:
mapping elements of the data processing network to a system address space;

assigning a first partition of the system address space to a first memory node controller of the data processing network, where the one or more computing devices and the one or more data resources are coupled to the first memory node controller;

receiving, at the first memory node controller, a request to access an element of the data processing network at a system address in the system address space;

servicing the request by the first memory node controller when the system address is in the first partition of the system address space assigning a second partition of the system address space to a second memory node controller of the data processing network where one or more additional data resources are coupled to the second memory node controller; and the first memory node controller:
  allocating memory in address range of the second partition of the system address space;
  entering the allocated address range in a system address translation table of the first memory node controller; and
  directing memory requests for an address in the allocated address range to the second memory node controller.

* * * * *